United States Patent [19]

Akutsu et al.

[11] Patent Number: 4,739,560
[45] Date of Patent: Apr. 26, 1988

[54] AZIMUTH SENSOR WHICH CORRECTS AZIMUTH CIRCLE DIAMETER AND CENTER FOR TEMPERATURE VARIATION

[75] Inventors: Kazushi Akutsu, Oobu; Hitoshi Ichikawa, Kariya, both of Japan

[73] Assignee: Nippondenso Co., Ltd., Kariya, Japan

[21] Appl. No.: 917,594

[22] Filed: Oct. 9, 1986

[30] Foreign Application Priority Data

Oct. 9, 1985 [JP] Japan .................. 60-225575

[51] Int. Cl.⁴ .................................. G01C 17/30
[52] U.S. Cl. ............................ 33/361; 324/224; 374/142
[58] Field of Search ............ 33/349, 361, 362; 374/142; 324/224

[56] References Cited

U.S. PATENT DOCUMENTS

| | | |
|---|---|---|
| 4,413,424 | 11/1983 | Sasaki et al. |
| 4,416,067 | 11/1983 | Scherer et al. |
| 4,480,226 | 10/1984 | Kuno et al. .................... 33/361 |
| 4,622,754 | 11/1986 | Chujo et al. .................... 33/361 |
| 4,646,014 | 2/1987 | Eulenberg .................... 324/224 X |

FOREIGN PATENT DOCUMENTS 36782 3/1980 Japan ..................... 324/224

Primary Examiner—William D. Martin, Jr.
Attorney, Agent, or Firm—Cushman, Darby & Cushman

[57] ABSTRACT

An azimuth calculation apparatus includes an azimuth sensor mounted on a moving body for detecting a direction of the moving body, the azimuth sensor having an excitation winding wound on an annular magnetic core and a pair of output windings wound on the core perpendicularly relative to one another to produce first and second output signals therefrom in response to energization of the excitation winding. The calculation apparatus is arranged to detect a temperature of the azimuth sensor and to determine a pair of correction values based on the detected temperature of the azimuth sensor so as to correct each value of the first and second output signals from the output windings to an optimal value for calculating the direction of the moving body in dependence upon the corrected output signals from the output windings.

10 Claims, 4 Drawing Sheets

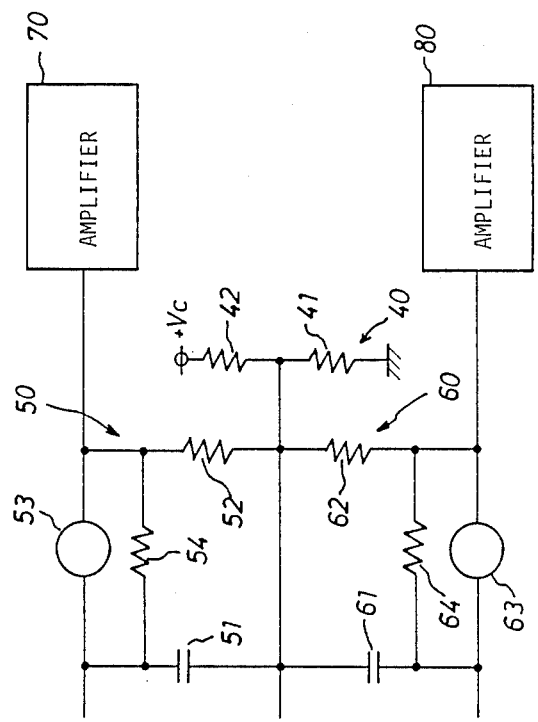
Fig. 6
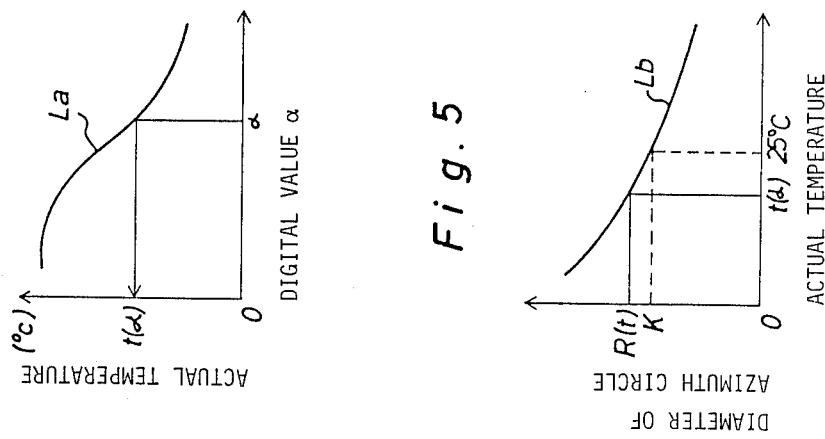
Fig. 4
Fig. 5

AZIMUTH SENSOR WHICH CORRECTS AZIMUTH CIRCLE DIAMETER AND CENTER FOR TEMPERATURE VARIATION

BACKGROUND OF THE INVENTION

1. Field of the Invention

The present invention relates to an azimuth calculation apparatus which includes an azimuth sensor mounted on a moving body such as an automotive vehicle for detecting a direction of the moving body relative to the earth's magnetism.

2. Description of the Prior Art

U.S. Pat. Nos. 4,413,424 and 4,416,067 respectively issued on Nov. 8 and 22, 1983, disclose a conventional azimuth sensor which is constructed with an excitation winding wound on an annular ferromagnetic core and a pair of output windings wound on the core perpendicularly relative to one another. In a condition where such an azimuth sensor is mounted on a moving body, an azimuth circle is determined by outputs of the output windings in a circular locus given by one rotation of the moving body. When a temperature of the azimuth sensor changes in a demagnetized condition of the moving body, the azimuth circle changes in diameter but does not change in its center. For this reason, the direction of the moving body can be detected on a basis of outputs from the azimuth sensor without causing any error. It has been, however, found that when a temperature of the azimuth sensor changes in a magnetized condition of the moving body, the azimuth circle changes in diameter and further changes in its center. This causes an error in calculation of the direction of the moving body based on the outputs from the azimuth sensor.

SUMMARY OF THE INVENTION

It is, therefore, an object of the present invention to provide an azimuth calculation apparatus capable of correcting an error in the outputs from the azimuth sensor caused by changes of the ambient temperature in a magnetized condition of the moving body.

According to the present invention, the object is attained by providing an azimuth calculation apparatus which comprises first means for detecting a temperature of the azimuth sensor, second means for determining a correction value based on the detected temperature of the azimuth sensor to correct each value of the outputs from the azimuth sensor to an optimal value, and third means for calculating the direction of the moving body in dependence upon the corrected outputs from the azimuth sensor.

BRIEF DESCRIPTION OF THE DRAWINGS

Other objects and advantages of the present invention will become more readily apparent from the following detailed description of a preferred embodiment thereof when taken together with the accompanying drawings, in which:

FIG. 4 is a graph illustrating a relationship between a detected digital value and the actual temperature of an azimuth sensor;

FIG. 5 is a graph illustrating a relationship between the actual temperature of the azimuth sensor and a diameter of an azimuth circle; and FIG. 6 is a schematic block diagram illustrating a modification of the azimuth display system shown in FIG. 1.

DESCRIPTION OF THE PREFERRED EMBODIMENTS

Figure 1:
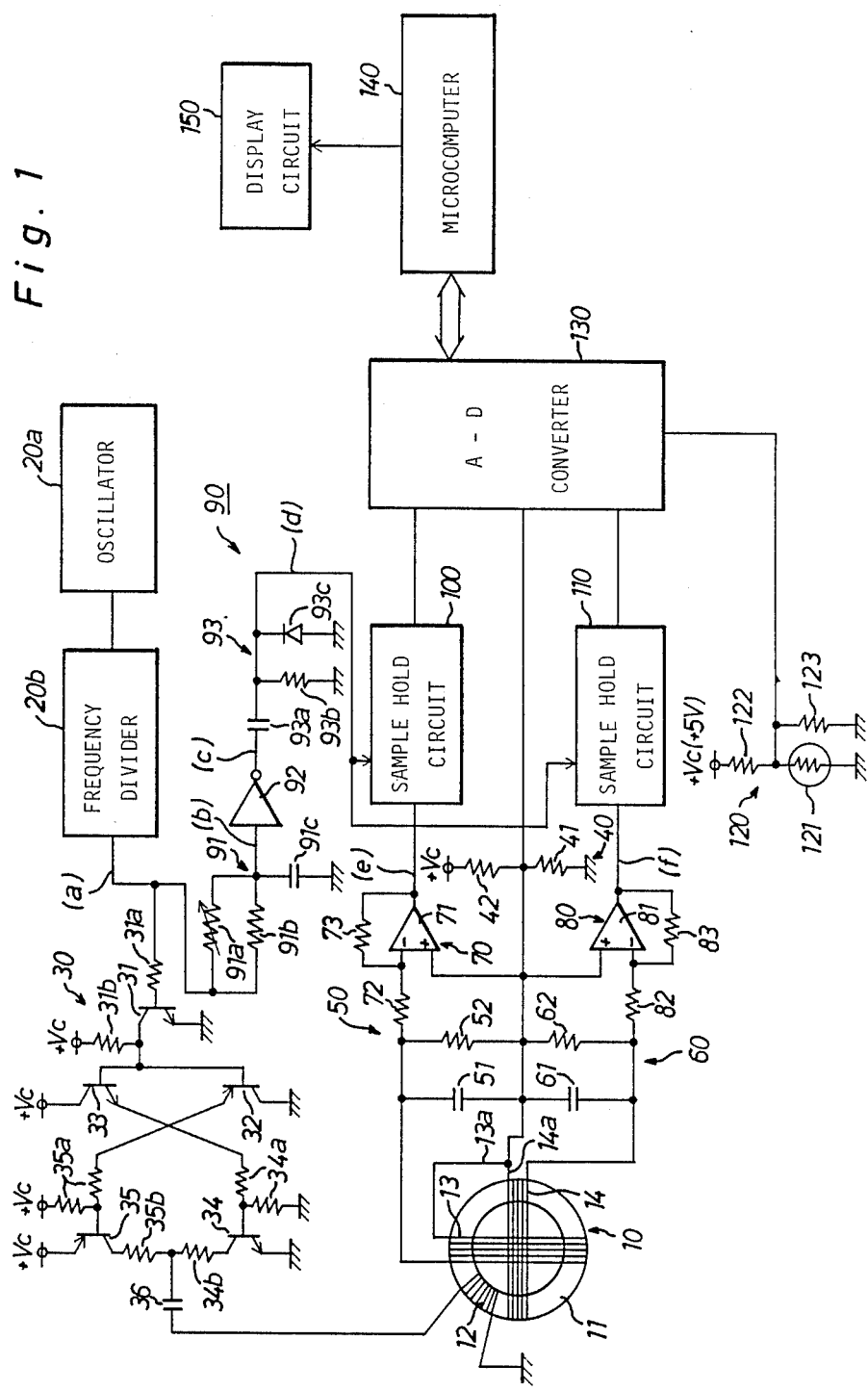
FIG. 1 is a schematic block diagram illustrating an azimuth display system to which is adapted an embodiment of the present invention.

In FIG. 1 of the drawings, there is illustrated an azimuth display system for automotive vehicles to which is adapted an embodiment of the present invention. The azimuth display system includes an azimuth sensor 10 which is constructed with an excitation winding 12 wound on an annular ferromagnetic core 11 and a pair of output windings 13, 14 wound on core 11 perpendicularly relative to one another. The azimuth sensor 10 is mounted on an appropriate portion of the vehicle and is placed in the earth's magnetism so that the output windings 13 and 14 produce first and second output voltages therefrom in accordance with the earth's magnetism acting thereon while the excitation winding 12 is being energized.

The azimuth display system further includes an oscillator 20a, a frequency divider 20b connected to oscillator 20a, and an excitation circuit 30 interposed between the frequency divider 20b and excitation winding 12 of azimuth sensor 10. The oscillator 20a produces an oscillation pulse at a predetermined frequency, and the frequency divider 20b divides the oscillation pulse in its frequency to produce the divided oscillation pulse. The excitation circuit 30 includes a transistor 31 of the NPN type which is connected at its base to an output terminal of frequency divider 20b through a resistor 31a and at its collector to a positive terminal +Vc of a direct current (or DC) source through a resistor 31b. The transistor 31 acts to amplify the respective divided pulses from frequency divider 20b in current so as to produce a series of current amplification pulses from its collector.

The excitation circuit 30 further includes a transistor 32 of the PNP type and a transistor 33 of the NPN type which are respectively connected at their bases to the collector of transistor 31. The transistor 32 is grounded at its collector, while the transistor 33 is connected at its collector to the positive terminal +Vc of DC source. The transistors 32 and 33 act to further amplify the current amplification pulses from transistor 31 in current so as to output a series of the current amplification pulses from their emitters, respectively. A transistor 34 of the NPN type is grounded at its emitter and at its base to the emitter of transistor 33 through resistors 34a of low resistance value. A transistor 35 of the PNP type is connected at its emitter to the positive terminal +Vc of DC source and at its base to the emitter of transistor 32 through resistors 35a of low resistance value. The collector of transistor 35 is connected to the collector of transistor 34 through resistors 35b and 34b. Thus, the transistors 34 and 35 act to further amplify the current amplification pulses from transistors 32 and 33 in current under control of the resistors 34a and 35a so as to output a series of excitation pluses therefrom. A DC cut-off capacitor 36 is connected to a common terminal of resistors 34b and 35b to apply therethrough the excitation pulses to the excitation winding 12 of azimuth sensor 10.

The azimuth display system further comprises a common voltage generator 40 connected to the output windings 13, 14 of azimuth sensor 10, a pair of filter circuits 50 and 60 connected to the output windings 13, 14 respectively, a pair of amplifiers 70 and 80 respectively connected to the filter circuits 50, 60, and a sampling pulse generator 90 connected to the frequency divider 20b. The common voltage generator 40 consists of resistors 41 and 42 which are connected in series to divide the DC voltage applied thereto from the DC source into a common voltage COM (for instance, 2.5 V). Thus, the output windings 13 and 14 are applied with the common voltage COM from the common voltage generator 40 at their common terminals 13a, 14a respectively to produce the first and second output voltages under control of a standard level defined by the common voltage COM.

The filter circuit 50 includes a capacitor 51 and a resistor 52 which are connected in parallel to the output winding 13 to filter the first output voltage of winding 13 so as to produce it as a first filtered alternating current (or AC) voltage. Similarly, the filter circuit 60 includes a capacitor 61 and a resistor 62 which are connected in parallel to the output winding 14 to filter the second output voltage of winding 14 so as to produce it as a second filtered AC voltage. The amplifier 70 is in the form of an operational amplifier 71 which is connected at its plus terminal to the output terminal of common voltage generator 40 and connected at its minus terminal to the output terminal of filter circuit 50 through an input resistor 72 and to its output terminal through a feed-back resistor 73. Thus, the operational amplifier 71 acts to amplify the first filtered AC voltage from filter circuit 50 at an amplification factor defined by the input resistor 72 and feed-back resistor 73 under control of the common voltage COM so as to produce it as a first amplified AC voltage. Similarly, the amplifier 80 is in the form of an operational amplifier 81 which is connected at its plus terminal to the output terminal of common voltage generator 40 and connected at its minus terminal to the output terminal of filter circuit 60 through an input resistor 82 and to its output terminal through a feed-back resistor 83. Thus, the operational amplifier 81 acts to amplify the second filtered AC voltage from filter circuit 60 at an amplification factor defined by the input resistor 82 and feed-back resistor 83 under control of the common voltage COM so as to produce it as a second amplified AC voltage.

The sampling pulse generator 90 includes an integrator 91 connected to the frequency divider 20b, and a differentiator 93 connected in series to the integrator 91 through an inverter 92. The integrator 91 consists of a variable resistor 91a and a resistor 91b which are connected in parallel to each other and connected to a capacitor 91c. The integrator 91 acts to integrate the leading and trailing edges of the divided pulse from frequency divider 20b at an integration time constant defined by the resistors 91a, 91b and capacitor 91c so as to produce an integration pulse. The integration time constant can be varied by adjustment of the variable resistor 91a.

The inverter 92 is arranged to invert the level of the integration pulse from integrator 91 so as to produce a rectangular wave pulse. The inversion of the integration pulse is conducted on a basis of a threshold level of inverter 92 which is determined to be approximately half of a maximum level of the integration pulse. The differentiator 93 includes a capacitor 93a connected to the inverter 92, a resistor 93b connected in series with capacitor 93a, and a diode 93c connected in parallel with resistor 93b. The differentiator 93 is arranged to differentiate the leading edge of the rectangular wave pulse from inverter 92 at a differentiation time constant defined by the capacitor 93a and resistor 93b so as to produce a positive differential pulse. In the differentiator 93, the capacitor 93a cooperates with the diode 93c to differentiate the trailing edge of the rectangular wave pulse so as to produce a negative differential pulse. In this instance, the diode 93c restrains the peak value of the negative differential pulse. Thus, the sampling pulse generator 90 produces the positive differential pluse as a sampling pulse.

The azimuth display system further comprises a pair of sample and hold circuits 100 and 110 connected to the sampling pulse generator 90 to be applied with the sampling pulse. The sample hold circuit 100 is arranged to hold the first amplified AC voltage from amplifier 70 in response to the sampling pulse from sampling pulse generator 90 so as to produce a first sample hold signal with a DC level X defined by the held AC voltage. Similarly, the sample and hold circuit 110 is arranged to hold the second amplified AC voltage from amplifier 80 in response to the sampling pulse from sampling pulse generator 90 so as to produce a second sample hold signal with a DC level Y defined by the held AC voltage.

The azimuth display system further comprises a temperature signal generator 120 which includes a temperature sensor 121 in the form of a thermistor with a negative temperature coefficient. The thermistor 121 is mounted on the azimuth sensor in such a manner that an internal resistance of thermistor 121 varies in accordance with the temperature of sensor 10. Thus, the temperature signal generator 120 acts to divide the positive terminal voltage (for instance, +5 V) of DC source under control of the thermister 121, resistors 122 and 123 so as to produce a temperature signal with a DC level defined by the divided positive terminal voltage.

An analog-to-digital (or A-D) converter 130 is arranged to convert the common voltage COM from common voltage generator 40, the first and second sample hold signals from sample hold circuits 100, 110 and the temperature signal from temperature signal generator 120 into digital signals respectively indicative of the common voltage COM, DC levels X, Y and $\alpha$. A microcomputer 140 is connected to the A-D converter 130 and has a read-only memory (or ROM) which is arranged to previously store therein a computer program illustrated by a flow chart in FIG. 3. In operation, the computer 140 executes the computer program in accordance with the digital signals applied thereto from the A-D converter 130 to produce output signals necessary for indicating the moving direction of the vehicle and apply them to a display circuit 150 connected thereto.

Assuming that in operation of the azimuth display system the frequency divider 20b cooperates with the oscillator 20a to produce a series of divided pulses therefrom, the excitation circuit 30 produces a series of excitation pulses in response to the divided pulses from frequency divider 20b to apply them to the excitation winding 12 of azimuth sensor 10. When applied with the excitation pulses, the excitation winding 12 is energized to generate a magnetic field in core 11. Even if the ambient temperature changes during such operation of the excitation circuit 30, fluctuation in voltage between the emitter and collector of transistor 34 and between the emitter and collector of transistor 35 will be maintained at an extremely small value under control of the resistors 34a and 35a. This enables effecting of stable energization of the excitation winding 12 in response to the excitation pluses from circuit 30 so as to produce first and second output voltages from windings 13 and 14 without any error caused by changes of the ambient temperature.

Figure 2:
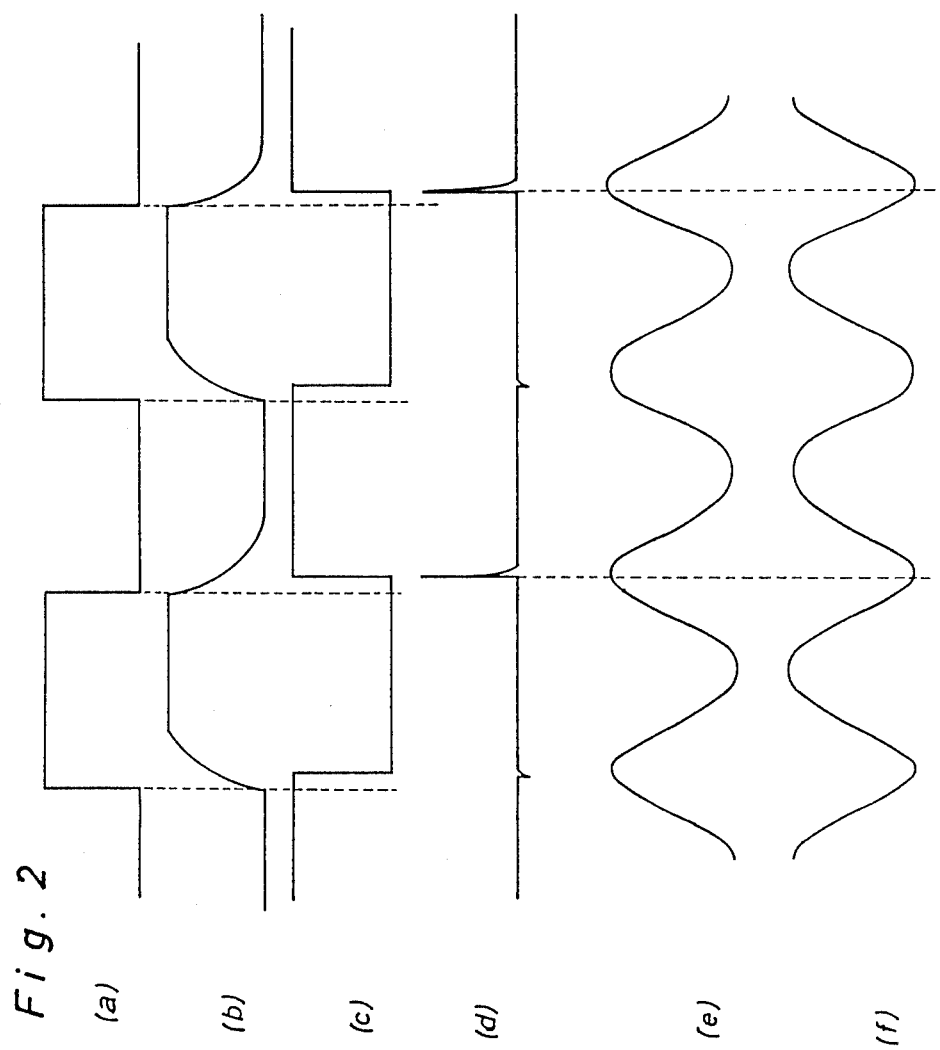
FIG. 2 illustrates input and output signals in a sampling pulse generator shown in FIG. 1.

Meanwhile, the integrator 91 of sampling pulse generator 90 starts to integrate the leading and trailing edges of the respective divided pulses (a) from frequency divider 20b at the predetermined integration time constant and to produce a series of integration pulses (b) as shown in FIG. 2. Subsequently, the integration pulses (b) are successively inverted by the inverter 92 in relation to its threshold level and produced as a series of rectangular wave pulses (c) as shown in FIG. 2. In this instance, the rectangular wave pulses (c) are produced with a time delay respectively at the leading and trailing edges thereof. Thus, the differentiator 93 differentiates each leading edge of the rectangular wave pulses (c) at its differentiation time constant to produce a series of sampling pulses (d) as shown in FIG. 2 and apply them to the sample and hold circuits 100 and 110.

When the output windings 13 and 14 of azimuth sensor 10 produce first and second output voltages therefrom in accordance with the earth's magnetism, the filter circuit 50 produces a first filtered AC voltage in response to the first output voltage from winding 13, while the filter circuit 60 produces a second filtered AC voltage in response to the second output voltage from winding 14. Subsequently, the amplifiers 70 and 80 produce first and second amplified AC voltages (e), and (f) therefrom in response to the first and second filtered AC voltages, as shown in FIG. 2, and apply them to the sample and hold circuits 100 and 110.

Thus, the sample and hold circuits 100 and 110 hold the first and second amplified AC voltages (e), (f) in response to the sampling pulse (d) from sampling pulse generator 90 to produce first and second sample hold signals therefrom. Since the integration time constant is previously determined by adjustment of the variable resistor 91a in such a manner that the sampling pulse (d) is produced from sampling pulse generator 90 when the first and second amplified AC voltages (e), (f) each are at a positive or negative peak level, the time period of the sampling pulse becomes two times of each time period of the first and second amplified AC voltages. Thus, each value of the first and second sample hold signals will alternately correspond with each peak value of the first and second amplified AC voltages from amplifiers 70 and 80. As a result, even if the first and second amplified AC voltages each are different in their adjacent AC wave forms and the same in their alternate AC wave forms, each value of the first and second sample hold signals will be maintained at the same level over time. It is, therefore, possible to eliminate an error caused by a difference between the adjacent AC wave forms of the respective output voltages from azimuth sensor 10. Furthermore, even if the first and second output voltages are irregularly produced from azimuth sensor 10, the first and second sample hold signals will be maintained at a desired level by adjustment of the variable resistor 91a of sampling pulse generator 90. This is effective to eliminate an error caused by irregularity in the characteristic of azimuth sensor 10.

Figure 3:
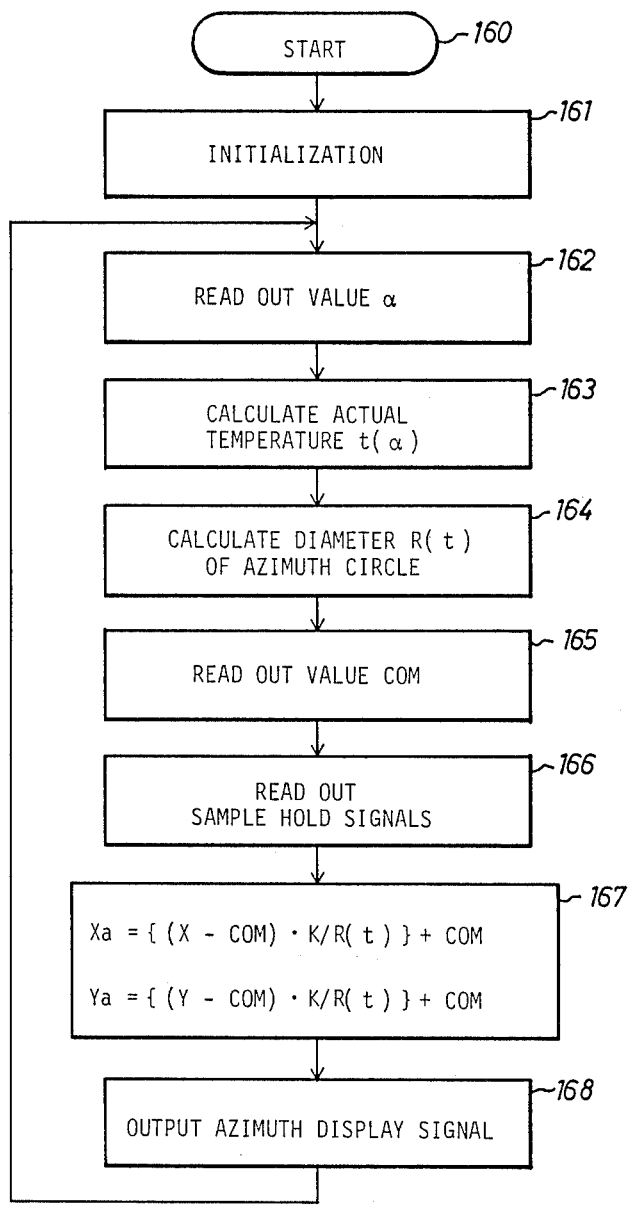
FIG. 3 is a flow chart of a computer program executed by a microcomputer shown in FIG. 1.

During such operation of the azimuth display system as described above, the computer 140 starts to execute the previously stored computer program at step 160 shown in FIG. 3 and initializes the program at step 161. When the program proceeds to step 162, the computer 140 reads out a digital value ($\alpha$) indicative of the temperature of azimuth sensor 10 which is applied thereto from the temperature signal generator 120 through the A-D converter 130. At the following step 163, the computer 140 calculates the actual temperature $t(\alpha)$ °C. of azimuth sensor 10 based on a characteristic curve La representing a relationship between the digital value ($\alpha$) and the actual temperature $t(\alpha)$ °C. (see FIG. 4) In this embodiment, the characteristic curve La is determined in consideration of the negative temperature coefficient of temperature sensor 121 and each value of resistors 122, 123 and is previously stored in the ROM of computer 140 for use with the flowchart of FIG. 3.

When the program proceeds to step 164, the computer 140 calculates a diameter $R(t)$ of an azimuth circle in relation to the calculated actual temperature $t(\alpha)$ °C. based on a characteristic curve Lb representing a relationship between the actual temperature $t(\alpha)$ °C. of azimuth sensor 10 and the diameter $R(t)$ of the azimuth circle. (see FIG. 5) In this embodiment, the characteristic curve Lb is determined in consideration of the thermal characteristic of azimuth sensor 10. The diameter $R(t)$ of the azimuth circle is decreased or increased in accordance with an increase or a decrease of the actual temperature $t(\alpha)$ °C. of azimuth sensor 10. A curve indicative of such relationship is shown in FIG. 5 and is previously stored in the ROM of computer 140. In the above-described relationship, an optimal diameter $R(t)$ of the azimuth circle is determined to be K when the actual temperature of azimuth sensor 10 is 25° C., and the azimuth circle is defined by the first and second output voltages of azimuth sensor 10 in a circular locus given by one rotation of the vehicle on a road.

When the program proceeds to step 165, the computer 140 reads out a digital value indicative of the common voltage COM which is applied thereto from the common voltage generator 40. This digital value is supplied by the A-D converter 130. At the following step 166, the computer 140 reads out digital values X and Y respectively indicative of the voltage on the first and second sample hold signals which are applied thereto from the sample hold circuits 100 and 110 through the A-D converter 130. When the program proceeds to step 167, the computer 140 calculates first and second correction values Xa and Ya respectively based on the following equations.

$$Xa = \{(X - COM)K/R(t)\} + COM \qquad (1)$$

$$Ya = \{(Y - COM)K/R(t)\} + COM \qquad (2)$$

where X is the digital value indicative of the first sample hold signal, COM is the digital value indicative of the common voltage, K is the optimal diameter of the azimuth circle, $R(t)$ is the calculated diameter of the azimuth circle, and Y is the digital value indicative of the second sample hold signal. In this embodiment, the equations (1), (2) are previously stored in the ROM of computer 140. The first and second correction values Xa and Ya are adapted to respectively correct errors in the first and second output voltages of windings 13 and 14 caused by changes of the temperature of azimuth sensor 10 in a magnetized condition of the vehicle. In other words, the first and second correction values Xa and Ya are adapted to correct the calculated diameter of the azimuth circle to the optimal diameter K in such a manner that the center of the calculated diameter coincides with the center of the optimal diameter K.

After calculation of the first and second correction values Xa and Ya, the computer causes the program to proceed to step 168 and calculates the moving direction of the vehicle on a basis of the correction values Xa and Ya to produce an azimuth display signal indicative of the moving direction. Finally, the display circuit 150 indicates thereon the moving direction of the vehicle in response to the azimuth display signal without any error caused by changes of the temperature of azimuth sensor 10 in a magnetized condition of the vehicle.

Although in the above embodiment, the characteristic curve Lb has been adapted to calculate the diameter R(t) of the azimuth circle in relation to the calculated actual temperature t($\alpha$) °C., it may be modified to calculate the diameter R(t) of the azimuth circle in relation to each actual temperature of the output windings 13 and 14 of azimuth sensor 10. In addition, the characteristic curves La and Lb may be replaced with a single characteristic curve representing a relationship between the values $\alpha$ and K/R(t).

In FIG. 6 there is illustrated a modification of the azimuth display system, wherein a temperature sensor 53 and a resistor 54 are connected in parallel to each other and interposed between the capacitor 51 and resistor 52 of filter circuit 50, and wherein a temperature sensor 63 and a resistor 64 are connected in parallel to each other and interposed between the capacitor 61 and resistor 62 of filter circuit 60. In this modification, the common voltage generator 40 is disconnected from the A-D converter 130, and the temperature signal generator 120 is eliminated. The temperature sensors 53 and 63 each are in the form of a thermistor with a negative temperature coefficient located adjacent the azimuth sensor 10. The respective values of resistors 54 and 52 are determined in relation to the negative temperature coefficient of sensor 53 to eliminate an error in the first output voltage of winding 13 caused by changes of the ambient temperature of azimuth sensor 10. Similarly, the respective values of resistors 64 and 62 are determined in relation to the negative temperature coefficient of sensor 63 to eliminate an error in the second output voltage of winding 14 caused by changes of the ambient temperature of azimuth sensor 10.

In operation of the modification, the filter circuit 50 produces therefrom a first filtered AC voltage in response to the first output voltage from winding 13 of azimuth sensor 10, while the filter circuit 60 produces therefrom a second filtered AC voltage in response to the second output voltage from winding 14 of azimuth sensor 10. If the ambient temperature of azimuth sensor 10 changes in a magnetized condition of the vehicle, each internal resistance value of temperature sensors 53 and 63 will decrease or increase in accordance with an increase or a decrease of the ambient temperature. As a result, an error in the first output voltage of winding 13 is eliminated under the control of sensor 53 and resistors 54, 52, while an error in the second output voltages of winding 14 is eliminated under the control of sensor 63 and resistors 64, 62. This is effective to eliminate an error in the first and second filtered AC voltages.

In another modification of the azimuth display system, the temperature sensor 53 and resistor 54 may be connected to the input resistor 72 of amplifier 70, while the temperature sensor 63 and resistor 64 may be connected to the input resistor 82 of amplifier 80. This is also effective to eliminate an error in the first and second filtered AC voltages from filter circuits 50 and 60.

While there have been illustrated and described a preferred embodiment of the present invention and certain modifications thereof, it will be apparent that other various modifications thereof will occur to those skilled in the art. It is, therefore, intended in the appended claims to cover all such modifications as fall within the spirit and scope of the present invention.

What is claimed is:

1. An azimuth calculation apparatus responsive to first and second output signals from an azimuth sensor, adapted to be mounted on a moving body, for detecting a direction of said moving body relative to the earth's magnetism, said azimuth sensor being of a type having an annular magnetic core, an exitation winding wound on said core, and a pair of output windings wound on said core perpendicularly to one another and connected to a common voltage source and which produce first and second output signals in response to energization of said excitation winding, the azimuth calculation apparatus comprising:

a temperature sensor for detecting a temperature of said azimuth sensor, and producing a temperature signal indicative thereof;

means, responsive to said temperature signal, for determining a diameter of an azimuth circle and correcting said diameter of said azimuth circle in accordance with a change of said temperature signal based on a relation indication of a thermal characteristic of said azimuth sensor;

means, responsive to the first and second output signals from said azimuth sensor and to a voltage signal from said voltage source, for correcting values of said first and second output signals such that an azimuth circle diameter for said corrected signals will coincide with an optimal diameter for said azimuth sensor, the center of which is defined by voltage signal; and means for calculating the direction of said moving body based on said corrected values of said output signals.

2. An azimuth calculation apparatus as claimed in claim 1, wherein said means responsive to the first and second output signals from said azimuth sensor and said voltge signal includes means for calculating first and second correction values Xa and Ya of said output signals respectively based on the following equations:

$$Xa = (X - COM)K/R(t) + COM$$

$$Ya = (Y - COM)K/R(t) + COM$$

wherein X is a value of said first output signal from said azimuth sensor, COM is a value of said voltage signal from said voltage source, K is said optimal diameter, R(t) is the calculated diameter of the azimuth circle, and Y is a value of said second output signal from said azimuth sensor.

3. An azimuth calculation apparatus as claimed in claim 1, wherein said temperature sensor is a thermistor with a negative temperature coefficient, mounted on said azimuth sensor.

4. An azimuth calculation apparatus responsive to first and second output signals from an azimuth sensor that is adapted to be mounted on a moving body for detecting a direction of said moving body relative to earth's magnetism, said azimuth sensor being of a type having an annular magnetic core, an excitation winding wound on said core, and a pair of output windings wound on said core perpendicularly to one another and connected to a common voltage source, to produce said first and second output signals therefrom in response to energization of said excitation winding, the azimuth calculation apparatus comprising:

first and second temperature sensors located adjacent said azimuth sensor and connected respectively in series with said output windings of said azimuth sensor, said temperature sensors each having a negative temperature coefficient;

first and second resistors, each connected in parallel with one of said temperature sensors, to adjust respective internal resistance values of said temperature sensors in accordance with a change of the abient temperature of said azimuth sensor; and means for calculating the direction of said moving body based on each value of said output signals from said azimuth sensor.

5. A calculation apparatus as in claim 4 wherein said means for calculating a diameter of an azimuth circle includes means for calculating an actual temperature of said azimuth sensor based on a restored relationship between said temperature signal and an actual temperature.

6. An azimuth calculation apparatus, comprising:

an azimuth sensor, adapted to be mounted on a moving body whose azimuth is to be calculated, of a type having an annular magnetic core, an excitation winding wound on said core, and first and second output windings wound on said core in a perpendicular fashion to one another, said excitation winding coupled to receive a voltage signal, and said first and second output windings producing first and second output signals in response to said excitation winding receiving said voltage signal, and in response to movement of said azimuth sensor;

means for detecting a temperature indicative of a temperature of said azimuth sensor, and producing a temperature signal indicative thereof;

memory means for storing a plurality of prestored information, said prestored information including a relationship between a change in diameter of an azimuth circle and a temperature of said azimuth sensor, and an optimal diameter of said azimuth sensor; and processing means, coupled to said first and second outputs of said azimuth sensor, said temperature signal of said temperature sensing means, and to an output of said memory means, for:

(1) calculating a diameter of an azimuth circle of said azimuth sensor in relation to said temperature based on said stored relation, (2) calculating correction values based on a value of said voltage signal, said optimal diameter, and said first and second output signals, (3) correcting said first and second output signals in a way such that they are indicative of output signals coinciding with an azimuth sensor having said optimal diameter a center of which being defined by said voltage signal; and (4) calculating a direction of movement of said moving body based on said corrected values.

7. An apparatus as in claim 6 wherein said processing means includes analog to digital converting means, receiving said voltage signal, said first and second output signals and said temperature signals, for converting said signals into digital signals, and sample and hold means connected between said output of said azimuth sensor and said analog to digital converter, for sampling and holding said first and second output signals.

8. Apparatus as in claim 6 wherein said read only memory means also includes means for storing a correction relation between said temperature signal and an actual temperature of said azimuth sensor.

9. Apparatus as in claim 6 wherein said processing means calculating correction value function includes means for calculating output signals based on the following equations:

$$Xa = (X - COM)K/R(t) + COM$$

$$Ya = (Y - COM)K/R(t) + COM$$

where X is a value of said first output signal from said azimuth sensor, COM is a value of said voltage signal from said voltage source, K is said optimal diameter, R(t) is the calculated diameter of the azimuth circle, and Y is a value of said second output signal from said azimuth sensor.

10. A method of calculating azimuth which is responsive to first and second output signals from an azimuth sensor that is adapted to be mounted on a moving body for detecting a direction of said moving body relative to earth's magnetism, the azimuth sensor being of a type having an annular magnetic core, an excitation winding wound on said core, a pair of output windings wound on said core perpendicularly to one another and connected to a common voltage source, and which produce first and second output signals in response to energization of said excitation winding, comprising the steps of:

detecting a temperature of said azimuth sensor and producing a temperature signal indicative thereof;

determining a characteristic curve based on a relation between a thermal characteristic of said azimuth sensor and a change in azimuth circle diameter;

calculating a diameter of an azimuth circle based on said temperature signal and said charascteristic curve, thereby obtaining a corrected said diameter of said azimuth circle in accordance with a change of said temperature signal;

receiving said first and second output signals form said azimuth sensor and said voltge signal from the voltage source, and correcting values of the first and second output signals such that an azimuth circle diameter of said corrected values coincides with an optimal diameter for said azimuth sensor, the center of said optimal diameter being defined by said voltage signal; and calculating a direction of movement of said moving body based on said corrected values.

* * * * *